(12) United States Patent
Kronsteiner et al.

(10) Patent No.: US 9,682,812 B2
(45) Date of Patent: Jun. 20, 2017

(54) DEVICE HAVING PIVOTABLE COMPARTMENTS

(71) Applicant: LISEC AUSTRIA GMBH, Seitenstetten (AT)

(72) Inventors: Alexander Kronsteiner, Blindenmarkt (AT); Walter Gunther, Waidhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 0 days.

(21) Appl. No.: 14/409,888

(22) PCT Filed: Jan. 27, 2014

(86) PCT No.: PCT/AT2014/000015
§ 371 (c)(1),
(2) Date: Dec. 19, 2014

(87) PCT Pub. No.: WO2014/113828
PCT Pub. Date: Jul. 31, 2014

(65) Prior Publication Data
US 2015/0368029 A1 Dec. 24, 2015

(30) Foreign Application Priority Data
Jan. 28, 2013 (AT) ........................ 59/2013

(51) Int. Cl.
*A47B 96/04* (2006.01)
*B65D 85/48* (2006.01)
(Continued)

(52) U.S. Cl.
CPC .............. *B65D 85/48* (2013.01); *A47B 57/00* (2013.01); *A47B 96/04* (2013.01); *B62B 3/108* (2013.01); *B65G 49/062* (2013.01)

(58) Field of Classification Search
CPC ......... A47B 57/00; A47B 57/58; A47B 96/04; A47G 19/08; B60P 3/002; B62B 3/10;
(Continued)

(56) References Cited

U.S. PATENT DOCUMENTS 2,902,168 A * 9/1959 Allen, Jr. ............. B65G 49/062
                                                          211/41.14
4,976,092 A   12/1990 Shuert
(Continued)

FOREIGN PATENT DOCUMENTS

AT           394987 B    9/1990
AT           401 258 B   9/1994
(Continued)

OTHER PUBLICATIONS

FI Search Report, dated Oct. 23, 2013, from corresponding FI application.
(Continued)

*Primary Examiner* — Joshua Rodden
(74) *Attorney, Agent, or Firm* — Young & Thompson

(57) ABSTRACT

A device, which is designed as a compartmented trolley or compartmented rack and which has compartments for accommodating sheet-type objects (glass panes), comprises a base rack (2), on which a plurality of frames (4) projecting upward are arranged. Each of the frames (4) contains rods (5), which are arranged parallel to one another and at a distance from one another in the frame (4). The rods (5) delimit compartments for accommodating the objects in the device (1). The frames (4) having rods (5) that delimit the compartments are pivotably supported on the base rack (2), wherein the pivoting axes (8) are arranged at the lower end of the frames (4) in the region of the base rack (2). The objects that are accommodated in compartments delimited (Continued)

by the rods (5) in the frames (4) rest with their bases, i.e. the lower horizontal edges, on sliding surfaces or rollers (7).

9 Claims, 2 Drawing Sheets

(51) Int. Cl.
  *B62B 3/10* (2006.01)
  *B65G 49/06* (2006.01)
  *A47B 57/00* (2006.01)

(58) Field of Classification Search
  CPC ........ B62B 3/108; B65D 85/46; B65D 85/48; B65G 49/062; B65G 49/063; B65G 49/064; B65G 49/069
  USPC ............. 211/41.1, 41.14, 41.15, 41.16, 85.8; 206/454
  See application file for complete search history.

(56) References Cited

U.S. PATENT DOCUMENTS

| | | | | |
|---|---|---|---|---|
| 5,209,627 A | * | 5/1993 | Lisec | B07C 5/36 198/408 |
| 5,823,732 A | * | 10/1998 | Lisec | E06B 3/67365 414/278 |
| 5,906,282 A | * | 5/1999 | Aldrich | B65G 49/062 206/454 |
| 6,135,294 A | | 10/2000 | Shuert | |
| 6,588,605 B1 | * | 7/2003 | Volkert | B65D 88/005 206/449 |
| 7,182,559 B1 | * | 2/2007 | Groth | B60P 7/10 410/32 |
| 7,217,077 B2 | * | 5/2007 | Mercure | B65G 49/062 209/542 |
| 7,878,754 B2 | * | 2/2011 | Mercure | B65G 49/062 414/801 |
| 2007/0045204 A1 | * | 3/2007 | Huard | B65G 49/062 211/41.14 |
| 2009/0250416 A1 | * | 10/2009 | Chookang | B65D 85/48 211/41.14 |

FOREIGN PATENT DOCUMENTS

| | | |
|---|---|---|
| AU | 633572 B | 2/1993 |
| DE | 2 70 4834 A | 8/1978 |
| DE | 44 05 782 A1 | 8/1995 |
| DE | 299 04 562 U1 | 1/2000 |
| EP | 603151 A | 6/1994 |
| EP | 0 770 756 A1 | 5/1997 |
| EP | 0 816 265 A | 1/1998 |
| EP | 1 612 161 A | 1/2006 |
| JP | H11-91944 | 4/1999 |
| JP | H11192953 A | 7/1999 |
| JP | 2002-273681 | 9/2002 |

OTHER PUBLICATIONS

CN Office Action, dated Nov. 2, 2015; Application No. 201480002437.7.

RU Office Action, dated Feb. 10, 2016; Application No. 2015105796/11.

* cited by examiner

DEVICE HAVING PIVOTABLE COMPARTMENTS

The invention relates to a device with compartments for the accommodation of plate-like objects.

BACKGROUND OF THE INVENTION

Devices with compartments (compartmented trolleys, compartmented racks) are known in the art. In this connection, for example, reference can be made to AT 394 987 B, AT 401 258 B, EP 0 603 151 A, EP 0 770 756 A and EP 0 816 265 A.

Also known is a compartmented trolley that has a series of compartments that are separated from one another by rods for the accommodation of glass panes that are supported essentially standing vertically and that are placed with their lower edges on the sliding surfaces or rollers of the compartmented trolley. In the case of this known compartmented trolley (or if it is designed without wheels, "compartmented rack" or "compartmented storage unit"), the rods that form compartments are attached in the frame and are oriented to run parallel to one another. It is also known that the rods that form and delimit compartments in the position of use of the compartmented trolley are tilted to form vertical planes, so that even the compartments delimited by the rods are tilted to form vertical planes, and the plate-like objects, such as, for example, glass panes that are deposited in the compartments, are tilted with respect to the vertical (for example by 5°).

In the case of known compartmented trolleys, at least the intake-side rods that delimit compartments are tilted toward the plane defined by the base rack of the compartmented trolley, so that during insertion of a plate-like object, the latter first enters with its lower front corner relative to the conveying direction (and not with its entire front edge) between two adjacent rods that delimit one compartment.

In the case of known compartmented trolleys, it has also been proposed to tilt the frames in opposite directions. It can thus be provided that the terminal frames are tilted toward one another, i.e., in opposite directions, so that plate-like objects, such as glass panes, can be inserted from both sides, as has been previously described, namely in such a way that the front lower corner of the plate-like object enters first into a compartment relative to the conveying direction.

The transport rack for glass panes, known from DE 27 04 834 A1, has two "walls," which can be pivoted around axes on the base rack. The walls do not delimit any "compartment." Rather, glass supports that can be pivoted around axes provided in the upper area of the walls are attached to the walls. The position of the glass supports is determined by engagement of pins into holes in the base rack. DE 27 04 834 A1 does not show frames that can be pivoted on a base rack.

EP 1 612 161 A does not relate to any storage rack with compartments, but rather a device for righting a packet of glass panes from a horizontal position into a vertical position. To this end, pivotable lifting arms are provided. Also, in FIG. 7 of EP 1 612 161 A, only one arrangement that consists of a number of storage facilities that support a plurality of righted glass packets is shown.

AU 633572 B shows a storage rack for glass panes, whereby individual supports on rollers can be moved in and out again in the rack. Any references to a pivoting of the supports are not disclosed.

In the case of the compartmented trolley known from JP H11192953A, the frames that delimit the compartments are plugged into holes in the bottom of the base rack. The frames therefore cannot be pivoted.

Devices equipped with compartments are known. In the latter, the compartments are delimited by frame-like or plate-like components. These components can be pivoted and adjusted with respect to changing the size, shape and orientation of the compartments delimited by them, as known from DE 44 05 782 A1, DE 299 04 562 U1, U.S. Pat. No. 4,976,092 A and U.S. Pat. No. 6,135,294 A. Pivotable components in devices for forming glass packets are known from EP 1 612 161 A1.

In the case of the known compartmented trolleys/compartmented racks, it is problematic that the frames, in which rods that delimit compartments are provided (clamped), are rigidly arranged on the base rack. Thus, it is not possible to adapt the compartmented trolleys/compartmented racks to the conditions that exist in each case.

SUMMARY OF THE INVENTION

It is the object of the invention to further develop a device of the above-mentioned type in such a way that it is more flexible and can be adapted easily to the conditions that exist in each case.

This object is achieved according to the invention with a device that has the features recited in the independent claims.

Preferred and advantageous configurations of the invention are the subject of the subclaims.

Since, in the device according to the invention (compartmented trolley or compartmented rack), at least one of the frames, but preferably a plurality of the frames, in which rods that delimit compartments are provided, can be pivoted (tilted) relative to the base rack, the option exists of adapting the orientation of the rods that delimit compartments to the conditions that exist in each case, in particular to the type and size of the plate-like objects to be inserted (for example, glass panes, insulating glass).

The option of pivoting (tilting) the frames with the rods that form compartments also makes it possible to supply the device with plate-like objects (glass panes), regardless of their size and shape, optionally from one side or the other, since it is possible in each case to orient the frame in such a way that the object to be inserted passes the compartment-delimiting rods of all frames first with its front lower corner relative to the conveying direction when it enters into a compartment.

For pivoting the frames holding the rods that form and delimit the compartments, a power drive can be provided, or the frames are simply pivoted by hand in the direction that is desired in each case.

Within the framework of the invention, it is taken into consideration that the pivoting of the frame with the rods that form compartments is limited to a specific pivoting area. This pivoting area can be divided by stopping positions, so that within the pivoting area, the position that is desired in each case (tilting of the frame with rods that delimit compartments) can be selected.

The option of pivoting frames with rods that form and delimit compartments in the case of the device according to the invention also allows the orientation of the rods that form compartments to change during the supplying and discharging process in order to ensure the optimal position of the rods for the respective working process.

BRIEF DESCRIPTION OF THE DRAWINGS

Additional units and features of the invention follow from the description given below of a preferred embodiment based on the drawings. Here.

DETAILED DESCRIPTION OF THE PREFERRED EMBODIMENTS

Figure 1:
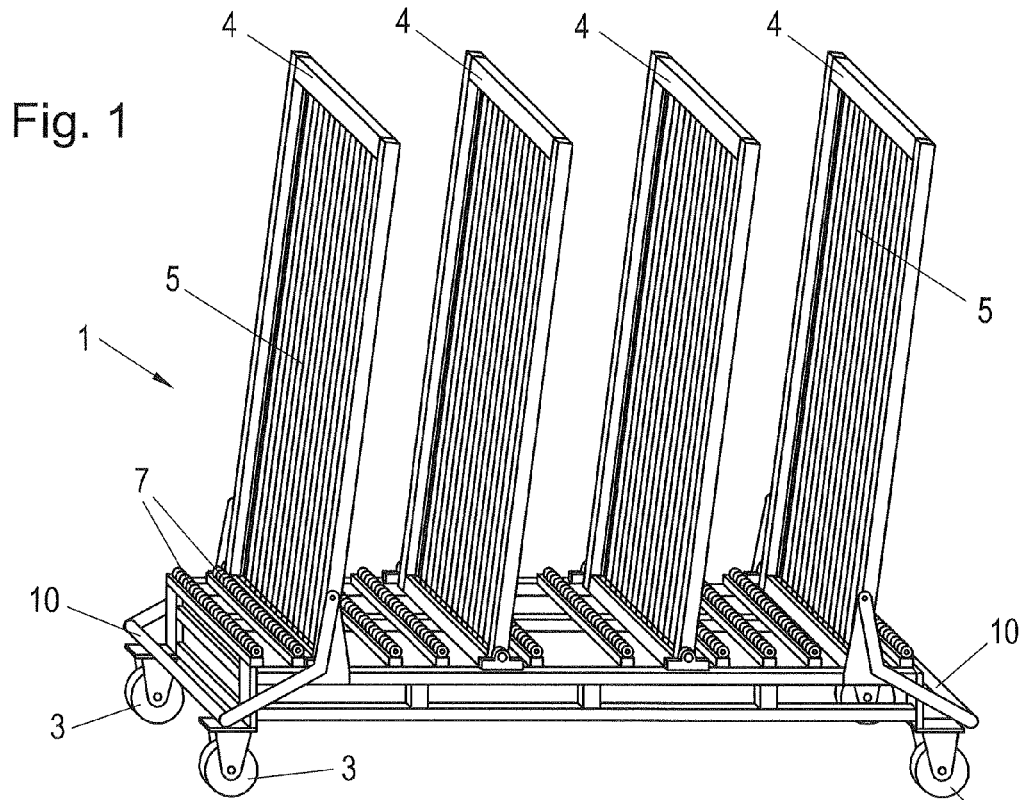
FIG. 1 shows a compartmented trolley, which is depicted in oblique view.
Figure 2:
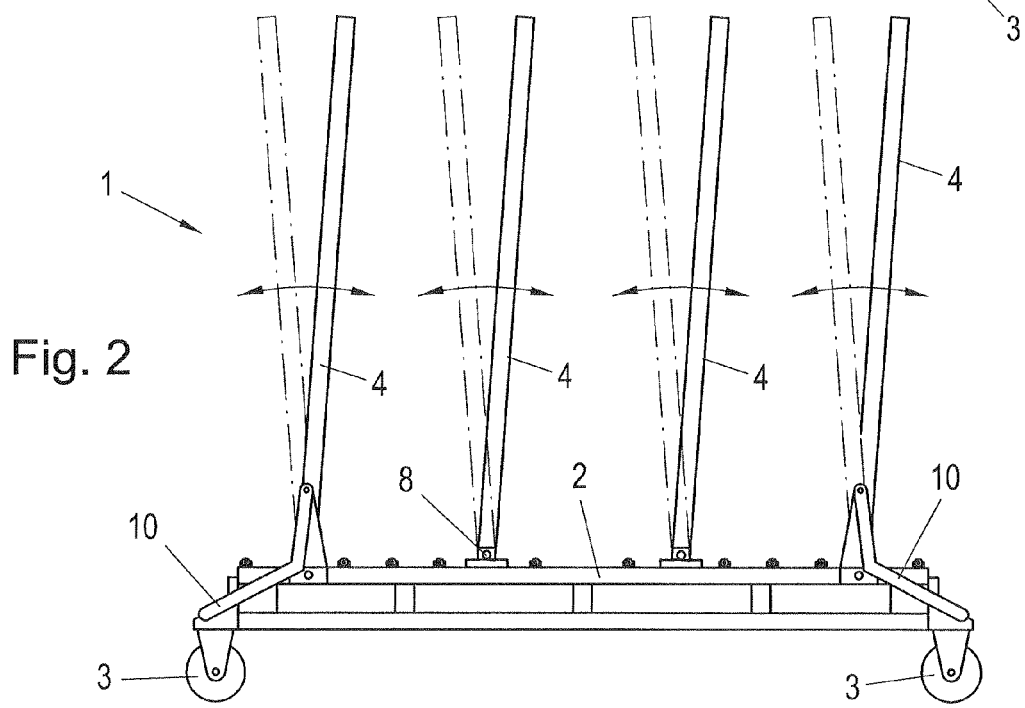
FIG. 2 shows, in schematized form, the compartmented trolley of FIG. 1 in side view.

A compartmented trolley 1 has a base rack 2, on which four castors 3 are provided in the embodiment shown. The castors 3 are not provided when it is a compartmented rack, which is stationary and can be run, for example, using a means of transport (forklift, etc.).

In the embodiment shown, four frames 4, which project upward from the base rack 2 of the compartmented trolley 1, are provided in the compartmented trolley 1. In the frames 4, a plurality of rods 5 (or rope) that are oriented parallel to one another are provided, and said rods are at a distance from one another and thus form compartments for the accommodation of plate-like objects, for example glass panes.

Tubes (not shown) can be inserted via the rods 5, and said tubes can rotate freely relative to the rods 5 in order to keep the frictional forces small between the plate-like object to be inserted and the rods 5, which delimit the compartments. Such tubes are known per se from AT 401 258 B.

The compartments are delimited below by sliding surfaces or rollers 7, so that the plate-like objects that are placed with their lower, horizontal edges on the sliding surfaces or rollers 7 can be inserted with low expenditure of energy.

In the case of the compartmented trolley 1, the frames 4 that hold the rods 5 can be pivoted around horizontal axes 8 on the base rack 2. The axes 8 are parallel to the plane of the frame 4 and preferably lie in the plane of the frame 4. The pivoting of the frame 4 can be carried out by hand or else by a drive (not shown), whereby the pivoting of all frames 4 together or else the pivoting of each of the frames 4 is possible regardless of the other frames 4.

In the case of the invention, consideration is also given to delimiting the pivoting area of the frames 4 so that the frames 4 can be pivoted (tilted) back and forth only within the specified pivoting area.

The brackets 10 arranged on both ends of the compartmented trolley 1 are handles that are used to move the compartmented trolley 1 by hand.

In addition, in particular in the pivoting area, consideration is given to providing locking positions for various tilting positions ("stopping positions") of the frames 4. As an alternative, a system can be provided with which the frames 4 can be stopped in any desired inclined position.

In the embodiment shown, the frames 4 with the rods 5 are essentially rectangular, so that the compartments in the position of use are oriented vertically, since the rods 5 that form compartments lie in planes that are perpendicular to the plane of the base rack 2 and that run crosswise to the frames 4 with rods 5 that form compartments. In other words, the rods 5 are oriented at right angles to the axis 8 (they are normal to the axis 8).

Figure 3:
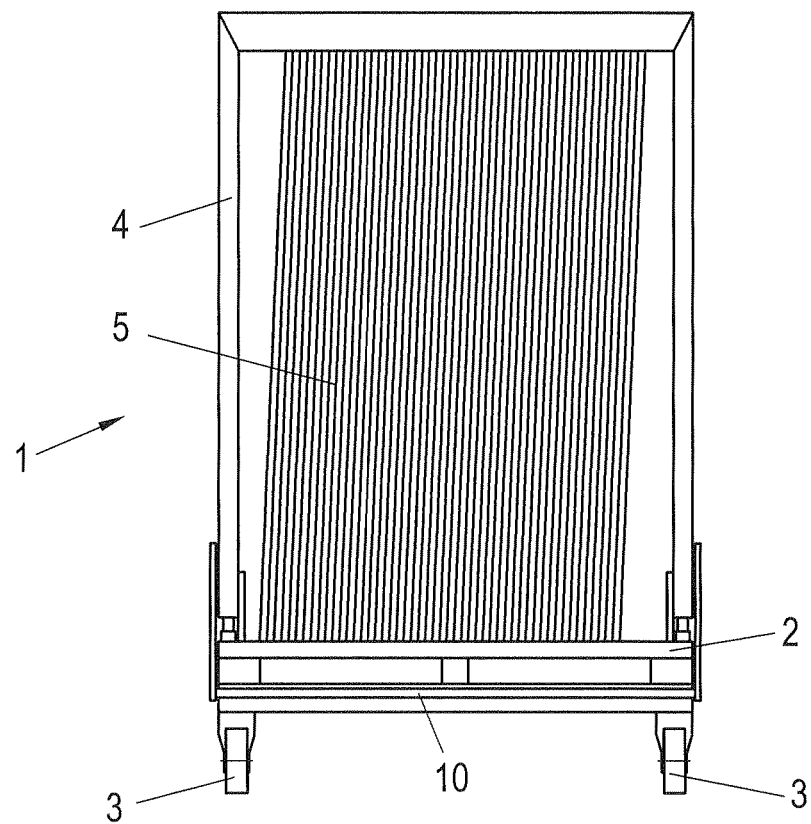
FIG. 3 shows the compartmented trolley of FIG. 1 seen from the left of FIG. 1.
Figure 4:
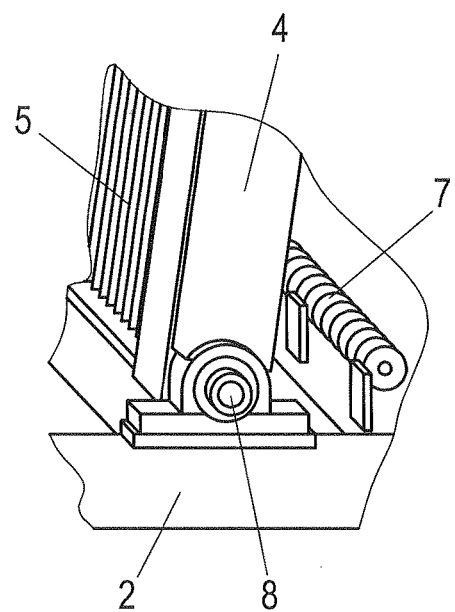
FIG. 4 shows a detail of the compartmented trolley of FIG. 1.

As shown in FIG. 3, the rods 5 that delimit compartments can also be oriented obliquely to the axis 8 in the case of rectangular frames 4 (they encompass an acute angle with the axis 8). The rods 5 thus delimit compartments that are at an acute angle with respect to the vertical and with respect to the plane of the base rack 2, e.g., are tilted with respect to the vertical by 5°.

In the invention, consideration is also given to making the frames 4 not rectangular but rather like a parallelogram, so that the rods 5 and thus the compartments are tilted by several degrees (for example by 5°) with respect to the vertical planes. In this case, the rods 5 that form compartments are tilted relative to planes that are perpendicular to the base rack 2 and that run crosswise to the frames 4 with rods 5 that form compartments, i.e., they encompass oblique angles with the axes 8. Such compartments that are tilted with respect to the vertical are preferred in certain cases, since then the objects accommodated in the compartments rest on the "lower" rods 5, which delimit compartments, and thus occupy a defined position.

It is also taken into consideration in the invention that the frames 4 with the rods 5 are formed by corners opposite to the axes 8, made in a hinged manner, and by hinged connections of the sides of the frame 4 with the axes 8, in such a way that they can be switched from their rectangular shape into a parallelogram-like shape and vice versa, so that the orientation of the compartments that is desired in each case can be oriented vertically (=perpendicular to the plane of the base frame) or tilted (=tilted with respect to the vertical). It can thus be achieved that the compartments delimited by the rods 5 have an orientation that corresponds to the conveying plane—tilted with respect to the vertical—of plate-like objects, in particular glass panes in arrangements for the production of insulating glass. When frames 4 are deformed like parallelograms, the angle that the lateral sides of the frame 4 and its rods 5 with the axis 8 encompass is altered.

The option of deforming the frames 4 like a parallelogram also makes it possible to modify the change in orientation of the compartments that are formed by rods 5 oriented at an oblique angle with respect to the axis 8, i.e., the tilting thereof.

Since the position of the compartments that are formed by rods 5 that are "oblique" with respect to the axis 8 (cf. FIG. 3) changes when the frame 4 pivots around the axis 8, the orientation of the compartments (tilted to a greater or lesser extent with respect to the vertical) can also be changed in the case of rigid frames 4 just by pivoting the same.

When a frame 4 or individual frames 4 are pivoted, the deformability of the frame(s) 4 can be used in the case of frames 4 that can be deformed like a parallelogram in order to modify the change in orientation of the compartments that are formed by the rods 5 of the frame 4 in such a way that these compartments also align with the other (not pivoted) frame 4 after the frame 4 pivots.

The position of rods 5 that delimit compartments in order to switch the latter, for example, from an orientation that is normal to the axis 8 into an orientation that is oblique with respect to the axis 8, can also be carried out in such a way that a frame 4 is pivoted around an axis that is oriented crosswise to its plane, for example lying at the height of the base rack 2. By such a pivoting of a frame 4 or several frames 4, the orientation of the rod 5 to each frame 4 can be changed relative to the axis 8, without the frame 4 itself being switched from a rectangular shape into a parallelogram-like shape (or vice versa).

In summary, an embodiment of the invention can be described as follows:

A device, designed as a compartmented trolley or compartmented rack, with compartments for the accommodation of plate-like objects (glass panes) has a base rack 2, on which a plurality of frames 4 projecting upward are arranged. Each of the frames 4 contains rods 5, which are arranged in the frame 4 parallel to one another and at a distance from one another. The rods 5 delimit compartments for the accommodation of objects in the device 1. The frames 4 with rods 5 that delimit compartments are mounted to pivot on the base rack 2, whereby the swivel axes 8 on the lower end of the frame 4 are arranged in the area of the base rack 2. The objects that are accommodated in compartments that are delimited by the rods 5 in the frames 4 stand up at the bottom, i.e., with their lower horizontal edges, on sliding surfaces or rollers 7.

The invention claimed is:

1. A device with compartments for the accommodation of plate-like objects, comprising:
    a plurality of frames (4), each frame having rods (5) arranged therein, the rods (5) arranged parallel to one another within corresponding frames (4) and forming compartments; and
    a base rack (2), on which the frames (4) are arranged projecting upward in a position of use,
    each of the frames (4) being oriented obliquely with respect to the base rack (2), and
    all the frames (4) each having a free first end and an opposite second end opposite to the free end, the second end of each frame (4) mounted to pivot around respective axes (8) each located on the base rack (2),
    wherein the rods (5) are tilted relative to a plane perpendicular to a plane of the base rack (2) and running crosswise to the frames (4), and encompass acute angles with the axes (8) around which the frames (4) all respectively pivot, and
    wherein the axes (8), around which the frames (4) respectively pivot, lie in an area of the base rack (2), and
    wherein each of the frames (4) is pivotable in the same direction.

2. The device according to claim 1, wherein each of the frames (4) is pivotable independently of one another.

3. The device according to claim 1, wherein the frames (4) can be attached in predetermined positions.

4. The device according to claim 1, wherein the frames (4) can be pivoted by a same angle.

5. The device according to claim 1, wherein the frames (4) can be pivoted by angles that are different from one another.

6. The device according to claim 1, wherein wheels or rollers are provided on a lower side of the base rack (2) opposite to the frames (4) in the position of use.

7. The device according to claim 1, wherein the rods (5) of the frames (4) are oriented to the base rack (2) in an oblique manner toward different sides.

8. The device according to claim 1, wherein, for each of the frames, the rods (5) are switchable between a first position, in which they are oriented in a perpendicular manner with respect to a respective one of the axes (8), and a second position in which the rods (5) that form compartments are tilted with respect to the respective one of the axes (8).

9. A device with compartments for the accommodation of plate-like objects, comprising:
    a plurality of frames (4), each frame having rods (5) arranged therein, the rods (5) arranged parallel to one another within corresponding frames (4) and forming compartments; and
    a base rack (2), on which the frames (4) are arranged projecting upward in a position of use,
    each of the frames (4) being oriented obliquely with respect to the base rack (2), and
    all the frames (4) each having a free first end and an opposite second end opposite to the free end, the second end of each frame (4) respectively mounted to pivot around respective axes (8) each located on the base rack (2),
    wherein the rods (5) are tilted relative to a plane perpendicular to a plane of the base rack (2) and running crosswise to the frames (4), and encompass acute angles with the axes (8) around which the the frames (4) all respectively pivot, and
    wherein the axes (8), around which the frames (4) respectively pivot, lie in an area of the base rack (2), and
    wherein each of the frames (4) is pivotable simultaneously and parallel to one another in the same direction.

* * * * *